Feb. 3, 1970          T. G. PETERSON ET AL          3,492,800
COLLECTION BAG APPARATUS FOR A LAWN MOWER
Filed June 23, 1967

INVENTORS
THOMAS G. PETERSON
MARVIN A. POMERANTZ
BY
*Dick, Zarley, Miller & Thomte*
ATTORNEYS 3,492,800
COLLECTION BAG APPARATUS FOR
A LAWN MOWER
Thomas G. Peterson and Marvin A. Pomerantz, Des
Moines, Iowa, assignors to Great Plains Bag Co., Des
Moines, Iowa, a corporation of Iowa
Filed June 23, 1967, Ser. No. 648,313
Int. Cl. A01d 43/00, 35/22
U.S. Cl. 56—202                        9 Claims

ABSTRACT OF THE DISCLOSURE

A collection bag apparatus for a lawn mower comprising, a supporting frame detachably secured to the lawn mower and having a chute means supported thereon which is in communication with the lawn mower discharge opening. The chute means includes an open rearward end which is adapted to detachably receive a perforated collection bag thereon.

Conventional collection bag apparatuses for lawn mowers are largely unsatisfactory inasmuch as they are not quickly and easily attached to or detached from the lawn mower. Additionally, the conventional collection bag apparatuses are cumbersome and are difficult to handle. Further, the conventional bags are not disposable but must be emptied upon becoming full.

Therefore, it is a principal object of this invention to provide a collection bag apparatus for a lawn mower which is quickly and easily attached to and detached from a lawn mower.

A further object of this invention is to provide a collection bag apparatus for a lawn mower which is stable in use.

A further object of this invention is to provide a collection bag apparatus for a lawn mower which is comprised of a supporting frame detachably secured to the lawn mower and having a chute means supported thereon, the chute means including an open rearward end which is adapted to detachably receive the collection bag.

A further object of this invention is to provide a collection bag apparatus including a collection bag which is constructed of a disposable paper material.

A further object of this invention is to provide a collection bag apparatus for a lawn mower including means thereon to limit the movement of the collection bag with respect to the supporting frame.

A further object of this invention is to provide a collection bag apparatus for a lawn mower which is economical of manufacture, durable in use and refined in appearance.

These and other objects will be apparent to those skilled in the art.

Figure 1:
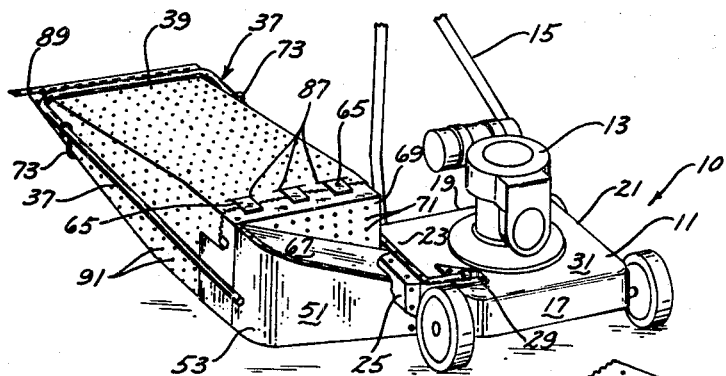
FIG. 1 is a front perspective view of a lawn mower having the collection bag apparatus secured thereto.

The numeral 10 generally designates a conventional lawn mower of the rotary type and including a wheel supported housing 11, power means 13 and handle 15. Housing 11 includes a forward end 17, rearward end 19, and opposite sides 21 and 23. Housing 11 is provided with a discharge opening 25 in side 23 as best illustrated in FIG. 1. The grass cuttings are blown from discharge opening 25 in conventional fashion.

Figure 3:
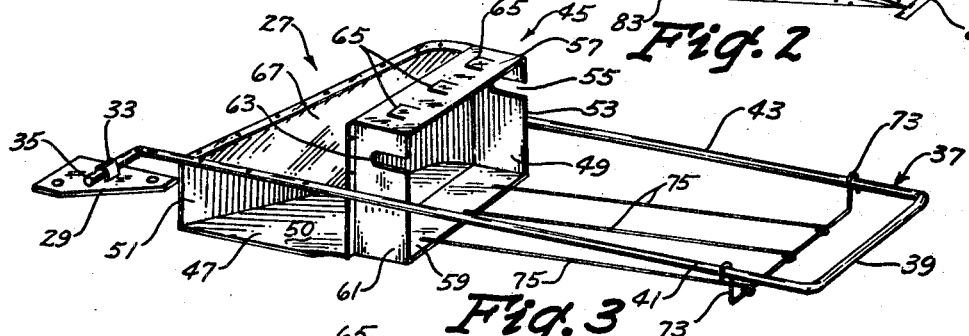
FIG. 3 is a perspective view of the supporting frame for the collection bag.

The collection bag supporting frame is best illustrated in FIG. 3 and is generally designated by the reference numeral 27. Frame 27 includes a flat bracket 29 which is secured to the top 31 of housing 11 by any suitable means such as bolts or the like. Bracket 29 includes an upstanding ear portion 33 which is adapted to pivotally receive an arm portion 35 of frame means 37. As seen in FIG. 3, frame means 37 is substantially U-shaped and includes a rear frame member 39 and opposite side frame members 41 and 43 extending forwardly therefrom.

A chute means 45 is secured to and extends between the forward ends of frame members 41 and 43 by any convenient means and includes an open forward end 47 and an open rearward end 49. Chute 47 includes a bottom 50 and a forward wall 51 extending upwardly therefrom which extends outwardly and rearwardly from the discharge opening 25 as best seen in FIGS. 1 and 3. The outer end of wall 51 is bent rearwardly to provide a wall member 53 and has a slot 55 formed therein as best seen in FIG. 3. The open rearward end 49 of chute 27 is defined by wall 53 and by a top wall portion 57, bottom wall portion 59 and side wall portion 61 (FIG. 3). Side wall 61 is provided with an opening 63 formed therein and top wall 57 is cut to provide a plurality of flexible fingers 65 formed therein. Chute 27 is provided with a top portion 67 extending from the upper end of forward wall 51 to a vertical wall portion 69 extending downwardly from the forward end of top wall 57. Wall 69 is provided with a plurality of perforations 71 formed therein to permit the flow of air therethrough.

As best seen in FIG. 3, a supporting rod 73 is detachably secured to and extends between frame members 41 and 43 and has a pluarlity of rod members 75 secured thereto and extending forwardly therefrom to bottom wall 59 to provide a supporting means for the collection bag.

Figure 2:
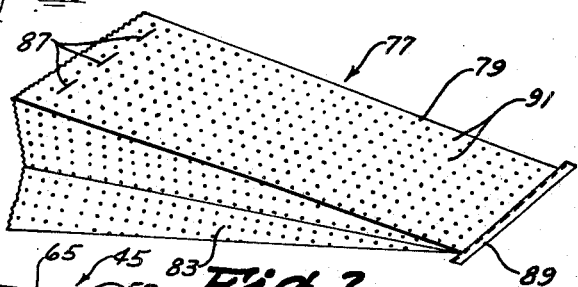
FIG. 2 is a perspective view of the collection bag.
Figure 4:
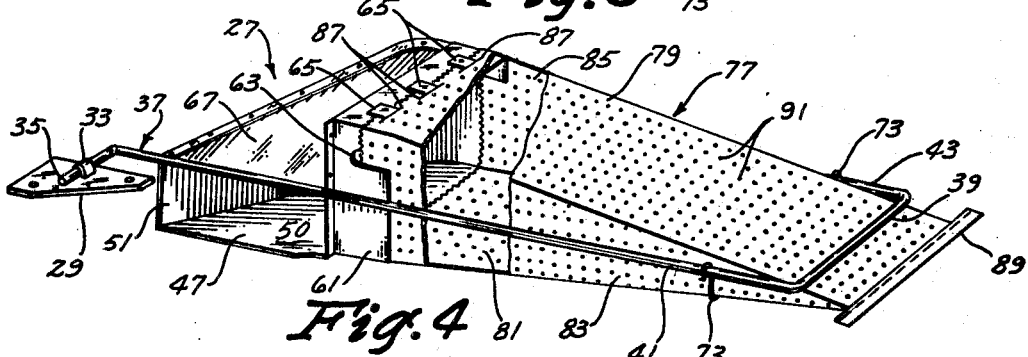
FIG. 4 is a perspective view of the supporting frame having the collection bag detachably secured thereto, a portion of the collection bag being cut away to more fully illustrate the invention.

The collection bag is generally designated by the reference numeral 77 and includes a top 79, bottom 81 and opposite sides 83 and 85. The forward end of bag 77 is open and the forward end of top 79 is provided with a plurality of slits 87 formed therein which are adapted to receive fingers 65 therethrough in the manner illustrated in FIG. 1. The rearward end of bag 77 is closed by a tab member 89 having its opposite ends extending laterally of the opposite sides of the bag as best seen in FIGS. 2 and 4. Preferably, bag 77 is constructed of a paper material and is provided with a plurality of perforations 91 formed therein to permit the flow of air therethrough.

The apparatus is attached to the lawn mower by simply causing the open forward end 47 to receive the discharge portion of the lawn mower while at the same time inserting arm member 35 through ear 33 as illustrated in FIG. 1. The close relationship between the discharge portion of the lawn mower and the open forward end of the chute will prevent any undesirable movement of the apparatus with respect to the lawn mower. The bag 77 is then secured to the chute by causing slits 87 to receive the fingers 65 as illustrated in FIG. 1 and so that the sides of the bag are received by openings 55 and 63 as also illustrated in FIG. 4. In FIG. 4 it can be seen that the lower portion of the sides 83 and 85 are embraced by the lower portions of the walls 61 and 53 respectively and that the forward end of bottom 81 is also embraced by the bottom wall 59. The bottom of bag 77 is supported by rods 75 and rod 73. When the bag is so supported, the tab 89 is positioned below the rear frame member 39 and the outer ends thereof will extend laterally of frame members 41 and 43. When the lawn mower is being operated, the bag will be inflated with the outer end of the tab 89 engaging the under sides of frame members 41 and 43 to limit the upward movement of the bag with respect to the frame. The grass clippings will be discharged from the lawn mower into the chute 27 which will deflect the same into the interior of the bag 77. Air is permitted to escape from the bag by means of perforations 91 and when the bag becomes full, it is a simple matter to remove the same for disposal. Inasmuch as the bag is constructed of a paper material, the bag may be disposed of together with the clippings therein. However, the bag may be reused by simply emptying the clippings therefrom and reinstalling the bag on the chute 27. The relationship of the forward end of the bag 77 with the fingers 65 and the openings 55 and 63 insures that the bag will be securely maintained on the supporting frame and will not become inadvertently detached therefrom during periods of use. The bags may be folded flat for convenient storage and it can be appreciated that the entire apparatus may be quickly removed from the lawn mower by simply moving the same away from the lawn mower thereby causing the disengagement of arm member 35 from ear 33 and causing the open forward end 47 of chute 27 to be removed from the discharge portion of the lawn mower.

Thus it can be seen that the device accomplishes at least all of its stated objectives.

We claim:

1. In combination with a rotary lawn mower having a housing with a discharge portion provided therein,
a supporting frame with a chute permanently rigidly fixed therewith, said chute having its forward end in communication with said discharge portion, and having an open rearward end, said supporting frame with said chute being detachably secured to said housing,
and a flexible collection bag detachably mounted on said frame; said bag having an open forward end detachably secured to the rearward end of said chute.

2. The combination of claim 1 wherein said bag is comprised of a perforated paper material.

3. The combination of claim 1 wherein said open rearward end of said chute includes spaced apart top and bottom wall portions and spaced apart side wall portions, said bag being detachably secured to said top wall portion.

4. The combination of claim 3 wherein said chute top wall portion is provided with a plurality of finger portions adapted to receive the forward end of said bag to limit the rearward movement thereof.

5. The combination of claim 3 wherein said chute side wall portions are provided with slots formed therein, said slots partially receiving the forward end of said bag.

6. The combination of claim 5 wherein said bag has said open forward end complementary in shape to the rearward end of said chute and includes top and bottom portions and side portions, said bag top portion being detachably secured to and embracing said chute top wall portion, said bag side wall portions embracing said chute side wall portions above said slots, said chute side wall portions embracing said bag side wall portions below said slots.

7. The combination of claim 1 wherein said frame is partly comprised of a U-shaped frame means and wherein said bag has a tab member secured thereto and extending laterally therefrom, the outer ends of said tab member engaging said U-shaped frame means to limit movement of said bag in an upwardly direction with respect to said frame means when said lawn mower is operating.

8. The combination of claim 4 wherein said bag is provided with a plurality of openings formed therein adjacent its said forward end adapted to receive said finger portions.

9. The combination of claim 6 wherein said chute has a bag supporting frame means extending rearwardly therefrom, the bottom portion of the forward end of said bag being supported by said chute bottom wall portion and said bag supporting frame means.

References Cited

UNITED STATES PATENTS

| 3,014,330 | 12/1961 | Oberdick | 56—25.4 |
| 3,112,597 | 12/1963 | Heth et al. | 56—202 |
| 3,133,396 | 5/1964 | Leader | 56—202 |
| 3,230,696 | 1/1966 | Liljenberg | 56—202 |
| 3,257,788 | 6/1966 | Pirie | 56—202 |
| 3,386,234 | 6/1968 | Leader | 56—202 |

F. BARRY SHAY, Primary Examiner

J. N. ESKOVITZ, Assistant Examiner

U.S. Cl. X.R.

15—83